United States Patent [19]

Jensen et al.

[11] Patent Number: 5,351,268

[45] Date of Patent: Sep. 27, 1994

[54] MODULAR LUMINESCENCE-BASED MEASURING SYSTEM USING FAST DIGITAL SIGNAL PROCESSING

[75] Inventors: Earl M. Jensen, Sunnyvale; Mei H. Sun, Los Altos; David L. Vecht, San Jose; Robert E. Melen, Saratoga, all of Calif.

[73] Assignee: Luxtron Corporation, Santa Clara, Calif.

[21] Appl. No.: 773,039

[22] Filed: Oct. 8, 1991

Related U.S. Application Data

[62] Division of Ser. No. 621,900, Dec. 4, 1990, Pat. No. 5,107,445.

[51] Int. Cl.$^5$ ............................................. G01K 11/20
[52] U.S. Cl. ..................................... 374/131; 364/525; 364/557; 374/130; 374/161
[58] Field of Search .................... 250/227.18, 227.21, 250/231.10, 458.1; 364/525, 526, 527, 557, 558; 372/41; 374/128, 129, 131, 159, 161, 130

[56] References Cited

U.S. PATENT DOCUMENTS

| | | | |
|---|---|---|---|
| Re. 31,832 | 2/1985 | Samulski | 374/131 |
| 4,215,275 | 7/1980 | Wickersheim | 374/137 |
| 4,223,226 | 9/1980 | Quick et al. | 250/458 |
| 4,296,318 | 10/1981 | Mezzetti et al. | 250/225 |
| 4,437,772 | 3/1984 | Samulski | 374/129 |
| 4,448,547 | 5/1984 | Wickersheim | 374/131 |
| 4,459,044 | 7/1984 | Alves | 374/131 |
| 4,490,822 | 12/1984 | Walling et al. | 372/41 |
| 4,562,348 | 12/1985 | Brogardh et al. | |
| 4,564,289 | 1/1986 | Spillman, Jr. | 356/33 |
| 4,577,109 | 3/1986 | Hirschfeld | 250/461.1 |
| 4,652,143 | 3/1987 | Wickersheim et al. | 374/161 |
| 4,708,494 | 11/1987 | Kleinerman | 374/161 |
| 4,716,363 | 12/1987 | Dukes et al. | |
| 4,740,081 | 4/1988 | Martens et al. | 250/231.1 X |
| 4,776,827 | 10/1988 | Greaves | 374/161 |
| 4,789,992 | 12/1988 | Wickersheim et al. | 374/161 |
| 4,816,687 | 3/1989 | Fehrenbach et al. | 250/459.1 |
| 4,895,156 | 1/1990 | Schulze | 128/634 |
| 4,986,672 | 1/1991 | Beynon | 374/131 |
| 4,988,212 | 1/1991 | Sun et al. | 374/161 |
| 4,997,286 | 3/1991 | Fehrenbach et al. | 374/131 |
| 5,004,913 | 4/1991 | Kleinerman | 250/227.21 |

FOREIGN PATENT DOCUMENTS

| | | |
|---|---|---|
| 0174506 | 3/1986 | European Pat. Off. |
| 60-164225 | 8/1985 | Japan |
| 60-164227 | 8/1985 | Japan |
| 2-256254 | 10/1990 | Japan ........................ 374/130 |
| 2113837 | 10/1983 | United Kingdom |

OTHER PUBLICATIONS

Sholes et al., "Fluorescent Decay Thermometer with Biological Applications", *Rev. Sci. Instrum.*, vol. 51, No. 7, Jul. 1980, pp. 882–884.

Bosselmann et al., "Fiber-Optic Temperature Sensor Using Fluorescence Decay Time", *Proceedings of the 2nd International Conference on Optical Fiber Sensors*, pp. 151–154.

(List continued on next page.)

*Primary Examiner*—William A. Cuchlinski, Jr.
*Assistant Examiner*—W. Morris Worth
*Attorney, Agent, or Firm*—Majestic, Parsons, Siebert & Hsue

[57] ABSTRACT

A luminescence-based integrated optical and electronic system for measuring temperature or some other parameter from the decay time of a luminescent sensor is disclosed. A high bandwidth, low noise amplifier applies a detected decaying luminescent signal to a digital system that acquires that signal and processes it in order to determine its decay time characteristics that are related to temperature or another parameter being measured. The digital signal processing includes use of a digital curve-fitting technique. A preferred luminescent material for temperature measurement is a chromium-doped yttrium gallium garnet material. The entire optical and electronic portions of the measuring system can be accommodated on a small single circuit card.

17 Claims, 6 Drawing Sheets

OTHER PUBLICATIONS

Press et al., *Numerical Recipes-The Art of Scientific Computing*, Cambridge University Press (1986), pp. 498-520 of Chapter 14.

Augousti et al., "A Laser-Pumped Temperature Sensor Using the Fluorescent Decay Time of Alexandrite", *Journal of Lightwave Technology*, vol. LT-5, No. 6, Jun. 1987, pp. 759-762.

Dowell et al., "Precision Limits of Waveform Recovery and Analysis in a Signal Processing Oscilloscope", *Rev. Sci. Instrum.*, vol. 58, No. 7, Jul. 1987, pp. 1245-1250.

Lutz et al., "Thermographic Phosphors: An Alternative to Bare Wire Type K Thermocouples at High Temperatures", *Industrial Heating*, vol. 54, No. 10, Oct. 1987, pp. 36-41.

Mannik et al., "The Application of Phosphor Thermometry to Generator Rotor Temperature Monitoring", *Electro-Optic Sensing and Measurement*, ICALEO '87 Proceedings, Nov. 8-12, 1987, pp. 23-27.

Grattan et al., "Ruby Decay-Time Fluorescence Thermometer in a Fiber-Optic Configuration", *Rev. Sci. Instrum.*, vol. 59, No. 8, Aug. 1988, pp. 1328-1335.

Augousti et al., "Visible-LED Pumped Fiber-Optic Temperature Sensor", *IEEE Transactions on Instrumentation and Measurement*, vol. 37, No. 3, Sep. 1988, pp. 470-472.

Jensen et al., "A Fiber Optic Temperature Sensor for Aerospace Applications," *Proceedings of the SPIE*, vol. 1369, pp. 87-95 (1991).

MODULAR LUMINESCENCE-BASED MEASURING SYSTEM USING FAST DIGITAL SIGNAL PROCESSING

This is a division of application Ser. No. 621,900, filed Dec. 4, 1990, now U.S. Pat. No. 5,107,445.

BACKGROUND OF THE INVENTION

This invention relates generally to the art of measuring physical parameters such as temperature by optical techniques, and, more specifically, to implementations that detect a time rate of decay of luminescence that is proportional to the parameter being measured.

Optical techniques using luminescent sensors to measure temperature have in recent years become accepted for many applications and several commercial products have appeared. Some temperature-dependent characteristic of the luminescent emission is measured and the temperature of the sensor determined from that measurement. The temperature of a surface can be measured by making direct contact between such a small luminescent sensor and the surface, or by painting the luminescent material directly on the surface, and then detecting the temperature-dependent luminescence by some type of remote or contact optical system. Such an optical system can use a length of optical fiber as one optical element. This technique has particular application for measuring the temperature of difficult to contact surfaces such as the surface of a rotating piece of machinery.

Commercially available products often attach the luminescent sensor at an end of a length of optical fiber to form a temperature-sensing probe. The temperature sensing probe is then placed in contact with an object, or within an environment, whose temperature is to be measured. The other end of the optical fiber is then connected to a measuring instrument. Since neither the sensor nor the optical fiber contain electrically conducting materials, temperatures may be measured in environments that are hostile to other measuring systems such as in high voltage fields, intense electromagnetic radiation fields or beams, or environments which contain chemicals which might corrode electrical sensors or their metallic leads. Optical fiber probes may also be made to be implanted in the human body for measuring internal body fluid or tissue temperatures. Since the optical fibers do not conduct electricity, the probes can be used in the processing of flammable or explosive materials where electrically safe sensors are required. Also, since the sensors have very small mass and since the fibers do not conduct heat away from the measurement location, more accurate sensing is possible. Further, such fiberoptic probes may be permanently installed in large, expensive electrical equipment, such as electrical generators and power transformers. The very small size of the sensor and optical fiber cable, as well as its immunity from environmental factors that prevent more conventional temperature sensing techniques from being used, contribute to a wide range of additional applications.

The temperature-dependent characteristic of luminescence that is emerging as preferred for use in commercial systems is the temperature sensitivity of its time rate of decay. Luminescent materials used as temperature sensors, in response to a pulse of radiation that causes them to commence luminescence, exhibit a decay of their luminescence, after termination of the exciting pulse, with a rate which varies with temperature. The most desirable luminescent materials for such use exhibit an exponential decay of luminescent intensity after cessation of the excitation radiation. This then allows the temperature being measured to be correlated with a decay "time constant" of the luminescence, a quantity normally referenced as $\tau$, which is defined as the time to reach $1/e$ of the initially-measured value of the decaying luminescence, where "e" is the natural logarithm base 2.71828 . . . . The advantage of monitoring luminescent decay time (or some other parameter related to it) is that the measurements are insensitive to changes in intensity of the signal that can occur over time as photodetectors and excitation sources change their characteristics with aging, or which occur during use such as may be caused by bending the optical fiber, which immediately changes the amount of attenuation of the light being passed through it. Other more gradual changes in fiber transmission can be caused by exposing the fiber to ionizing radiation which then causes increased absorption at certain wavelengths, by exposing the fiber to various liquids which can alter the index of refraction of the cladding layer which in turn alters the transmission of the fiber, or by exposing the fiber to a changing thermal environment which changes the relative indices of refraction of the fiber core and cladding.

There are several analog techniques for measuring a temperature dependent characteristic of the luminescent decay which process the electrical signal output of the photodetector in different ways. One technique is to measure the intensity level at two times during the decay process. Examples of this are described in U.S. Pat. Nos. 4,223,226—Quick et al., (1980), 4,652,143—Wickersheim et al. (1987), and 4,789,992—Wickersheim et al. (1988). Another technique is to excite the luminescent material sensor by driving the excitation source with a sine wave, and then comparing with the excitation signal the relative phase of the resulting luminescent signal. The phase difference is proportional to the temperature-dependent luminescent decay time. This is described in U.S. Pat. Nos. Re. 31,832—Samulski (1985) and 4,437,772—Samulski (1984), and in the following published papers: Augousti et al., "A Laser-Pumped Temperature Sensor Using the Fluorescent Decay Time of Alexandrite", *Journal of Lightwave Technology*, Volume LT-5, No. 6, June 1987, pages 759–762; Grattan et al., "Ruby Decay-Time Fluorescence Thermometer in a Fiber-Optic Configuration", *Rev. Sci. Instrum.*, Volume 59, No. 8, August 1988, pages 1328–1335; and Augousti et al., "Visible-LED Pumped Fiber-Optic Temperature Sensor", *IEEE Transactions on Instrumentation and Measurement*, Volume 37, No. 3, September 1988, pages 470–472. A similar concept for measuring free oxygen concentrations by means of the effect of the oxygen on the decay time of luminescent material exposed thereto is described in U.S. Pat. No. 4,716,363—Dukes et al (1987).

Another way to measure the decay time is to integrate the photodetector output for a time, thereby calculating the area under the decaying intensity curve. A ratio of integrals can then be employed to provide a self-referenced (intensity independent) measurement. A proposal for doing this was made by Sholes et al., "Fluorescent Decay Thermometer with Biological Applications", *Rev. Sci. Instrum.*, Volume 51, No. 7, July 1980, pages 882–884. Another integration and ratioing technique has been described in U.S. Pat. No. 4,776,827—Greaves (1988).

More recent signal processing techniques include a closed loop, feedback circuit between the photodetector and excitation source with a characteristic of the feedback signal being proportional to temperature. In one such system, a voltage-controlled oscillator (VCO) drives an excitation light source at a frequency determined by the decay time being measured. This is described by Bosselmann et al., "Fiber-Optic Temperature Sensor Using Fluorescence Decay Time", *Proceedings of the 2nd International Conference on Optical Fiber Sensors*, pages 151-154, in British Patent No. 2,113,837—Bosselmann (1986), and in European patent application publication No. 174,506—Franke et al. (1986). Another closed-loop system described in U.S. Pat. No. 4,816,687—Fehrenbach et al. (1989) uses an integrator in the feedback loop that provides a quantity proportional to decay time and hence temperature.

The luminescent sensors in such systems are typically excited by a flash lamp, a laser or a light-emitting diode (LED). A flash lamp provides a short burst of excitation energy in response to an electrical pulse. LEDs may be pulsed much more rapidly, and their output can be much more precisely controlled in terms of consistency of light intensity. LEDs are also less expensive, easier to work with, have a longer life, require less power to operate, and generate less heat that needs to be dissipated. In the closed-loop systems described above, an LED is utilized to provide a periodically fluctuating light intensity function to excite the luminescent sensor.

Since the most efficient LEDs have a near infrared or red light output, their use does place some constraints on the composition of the luminescent material that is utilized in the sensor. The chosen luminescent material must absorb in the wavelength band emitted by the LED, with the desired resultant fluorescent emission occurring at slightly longer wavelengths that are still short enough to be detectable by fast, sensitive photodetectors such as photomultipliers or photodiodes.

The analog techniques and systems described above may give results that are subject to some non-thermal changes over time, but this is generally accepted as inevitable and compensated for by providing for occasional system recalibration. Causes of drift and changes over time most frequently result from gradual changes in the characteristics of analog electronic components such as those used in amplifiers, comparators and the like.

It is therefore a principal object of the present invention to provide a luminescent sensor-based measurement system that is usable with confidence over a long period of time to provide accurate results with consistency.

In addition to the analog techniques which are being commercialized, digital techniques have been suggested. Examples are found in the following papers: Dowell et al., "Precision Limits of Waveform Recovery and Analysis in a Signal Processing Oscilloscope", *Rev. Sci. Instrum.*, Volume 58, No. 7, July 1987, pages 1245-1250; Lutz et al., "Thermographic Phosphors: An Alternative to Bare Wire Type K Thermocouples at High Temperatures", *Industrial Heating*, Volume 54, No. 10, Oct. 1987, pages 36-41; and Mannik et al., "The Application of Phosphor Thermometry to Generator Rotor Temperature Monitoring", *Electro-Optic Sensing and Measurement*, ICALEO '87 Proceedings, Nov. 8-12, 1987, pages 23-27. However, a fully digital approach has not been implemented to-date in a small, economical measurement instrument. This is in part because digital processing chips having the necessary speed and capacity have only recently become available at a reasonable cost.

Therefore, it is another object of the present invention to provide a luminescent sensor-based measuring system that utilizes digital signal processing in a manner that allows the system to be made very small and compact, have low power requirements, and exhibit a high degree of ruggedness.

It is also an object to provide a small and relatively inexpensive module which can be used in portable or OEM instrumentation applications.

It is another object of the present invention to provide a luminescent sensor-based measuring technique that can be implemented with low-cost components and be practical for use in many different specific applications.

It is yet another object of the present invention to provide such a technique that can yield precise measurement results in short periods of time, and, if necessary, can operate reliably even when the luminescent intensity from the sensor is relatively weak because of extended fiber length, a large number of connections, or long-term degradation such as might be caused by LED aging.

SUMMARY OF THE INVENTION

These and additional objects of the present invention are accomplished by its various aspects wherein, generally, according to a first aspect thereof, a luminescent sensor is excited by sequential light pulses from an LED, thereby to provide a repetitive decaying luminescent signal to a photodetector whose electrical output is digitized after passing through a low noise, wide bandwidth amplifier. Digital samples of the luminescent decay are then processed by a curve fitting technique such as a least squares algorithm. In a preferred embodiment, however, an exponential luminescent decay curve is first processed by taking the natural logarithm of the decaying function, thereby obtaining a straight line whose slope is proportional to the decay time of the luminescent intensity. Prior to such calculation, the digital data is corrected for any background signal that is present in the decaying signal to be processed. This background signal is periodically measured in the absence of the excitation and luminescent signals. The exciting LED is also adjusted in intensity to maintain the luminescent signal at a desired level.

Such a system has a low noise level and is very stable over time, because of the large number of data points averaged and the very few analog components utilized. The amount of time necessary to make a measurement is also quite short, thereby allowing the use of luminescent materials having a short decay time. Precision can be further enhanced by averaging a large number of such measurements before outputting a decay constant or other characteristic of the decaying luminescent signal that is proportional to temperature or other parameter being measured. A relatively fast data output can be maintained, even with such multi-measurement averaging, because of the high pulse repetition rate possible with the LED and the fast decay times of the luminescent materials preferably used. Because so many individual luminescent decay times can be practically averaged, an optical fiber between the instrument and luminescent material can be small and the LED used can be of modest power, since any errors that result from a low luminescent signal level are reduced or eliminated by the averaging of such a large number of samples.

Examples of luminescent materials having suitable fast fluorescent decay times which are excitable in the long-wavelength portion of the visible range whose LEDs or laser diodes can be utilized as the exciting source, and which emit fluorescent radiation at somewhat longer wavelengths than that of the exciting radiation but at wavelengths which are none-the-less short enough to allow the use of fast sensitive photodetectors such as photomultiplier tubes or photodiodes, are various components containing either trivalent rare earths such as neodymium or trivalent chromium. Several inorganic compounds activated with chromium have in fact been proposed or utilized previously in LED-pumped temperature measurement systems, as described in the documents cited above. These include chromium-activated lutetium aluminum borate and chromium-activated yttrium aluminum garnet. While these materials can also be used in the system to be described, it has been found to be preferred to use instead, according to another aspect of the present invention, chromium-activated yttrium gallium garnet since in this material the desired activator concentration is more readily achieved and more uniformly distributed, the resultant material is found in practice to have decay properties which are relatively insensitive to specific preparation procedures and variables, and the excitation and emission wavelengths are especially well-suited to the use of readily available LEDs as the exciting source. On the other hand, different sensor materials may be preferred for specific applications and temperature ranges.

The sensor material is prepared in powder form by firing the mixed oxides at an appropriately high temperature in a furnace and then grinding and refiring multiple batches of material to produce the specific characteristics required. By such techniques it is possible to produce materials with highly reproducible characteristics which can then be used to produce commercial sensors, all of whose measured decay times can be converted to temperatures using the luminescent powder, electro-optic module and a standard calibration curve with an error of no more than 1° C., with no special calibration being required.

The luminescent sensor material is highly stable, having intrinsic decay rates that correlate reproducibly with temperature or other parameter being measured. Since the decay measurement is made digitally with a primary dependence on the frequency of a very stable quartz crystal oscillator, the system is much less prone to drifts, such as those experienced by analog measuring instruments of the types discussed above.

According to another aspect of the present invention, the above-described measurement system is provided with most or all of the required electronics carried by a single printed circuit board on which an optical head can also be mounted. The optical head includes the LED, photodetector, and an optical connector that accepts one end of an optical fiber which communicates with the luminescent sensor. This provides a module that is easily included as a subassembly of other electronic equipment, instruments or electrical systems.

The optical head performs several functions, supporting the light source, beam splitter, lenses, fiber connector and detector in proper alignment, providing via the dichroic beam splitter and filter the capability of separating excitation and fluorescent radiation with minimal signal loss, and shielding the sensitive detector system from other stray light from the environment. The amount of useful light reaching the detector sets the primary limit on the performance of the system and yet the optical head needs to be assembled with minimum labor and to require minimum testing if cost are to be kept low. Optical and mechanical component costs are typically much higher than electronic component costs since the better components are made in high volumes for other applications whereas the optical and mechanical parts tend to be more highly customized and are thus made in much smaller volumes. The design of the optical head is therefore important to the system design in that it must (1) be small enough to be mountable on the PC board, (2) be simple enough in number of parts and ease of fabrication, assembly and testing to cost relatively little as a subassembly, and yet (3) provide the desired optical performance from unit-to-unit with essentially no adjustment required.

The electronic system on the board may provide a signal representing the ultimate temperature or other parameter being measured. Alternatively, the electronics can be designed for interfacing with a host computer to which the time constant or other luminescent decay information is provided. The host computer then converts the luminescent decay information into values of temperature or other parameter being measured. The use of the small module remotely from a larger data processing and control system is yet another possibility.

According to another aspect of the present invention, an improved wide bandwidth, low noise multi-stage amplifier is provided for amplifying the output of the photodetector before the signal is transmitted to an analog-to-digital converter. A first transconductance stage converts current through the photodetector into a voltage. The parameters of this first stage are selected to both minimize noise generated by this stage and to maximize its bandwidth, normally competing goals.

According to yet another aspect of the present invention, the effect of finite rise times inherent in the system's front-end electronics may be substantially eliminated in order to allow the system to work with short luminescent decay times. The rise time characteristics of the front end are periodically measured by the system, and a resulting transfer function is stored in memory. That transfer function is then correlated with actual luminescent decay signals to substantially eliminate the effect of the finite rise time. This allows the instrument to measure the luminescent decay signal shortly after termination of an excitation radiation pulse, which would not be possible without this compensation. Therefore, the decay time measurement is made when the signal is at a high value, rather than having to wait until the electronic components stabilize, at which time the decaying signal would be lower in intensity so as to make accurate measurement difficult.

Additional objects, advantages and features of the various aspects of the present invention will become apparent from the following description of its preferred embodiments, which description should be taken in conjunction with the accompanying drawings.

DESCRIPTION OF THE PREFERRED EMBODIMENTS

Figure 1:
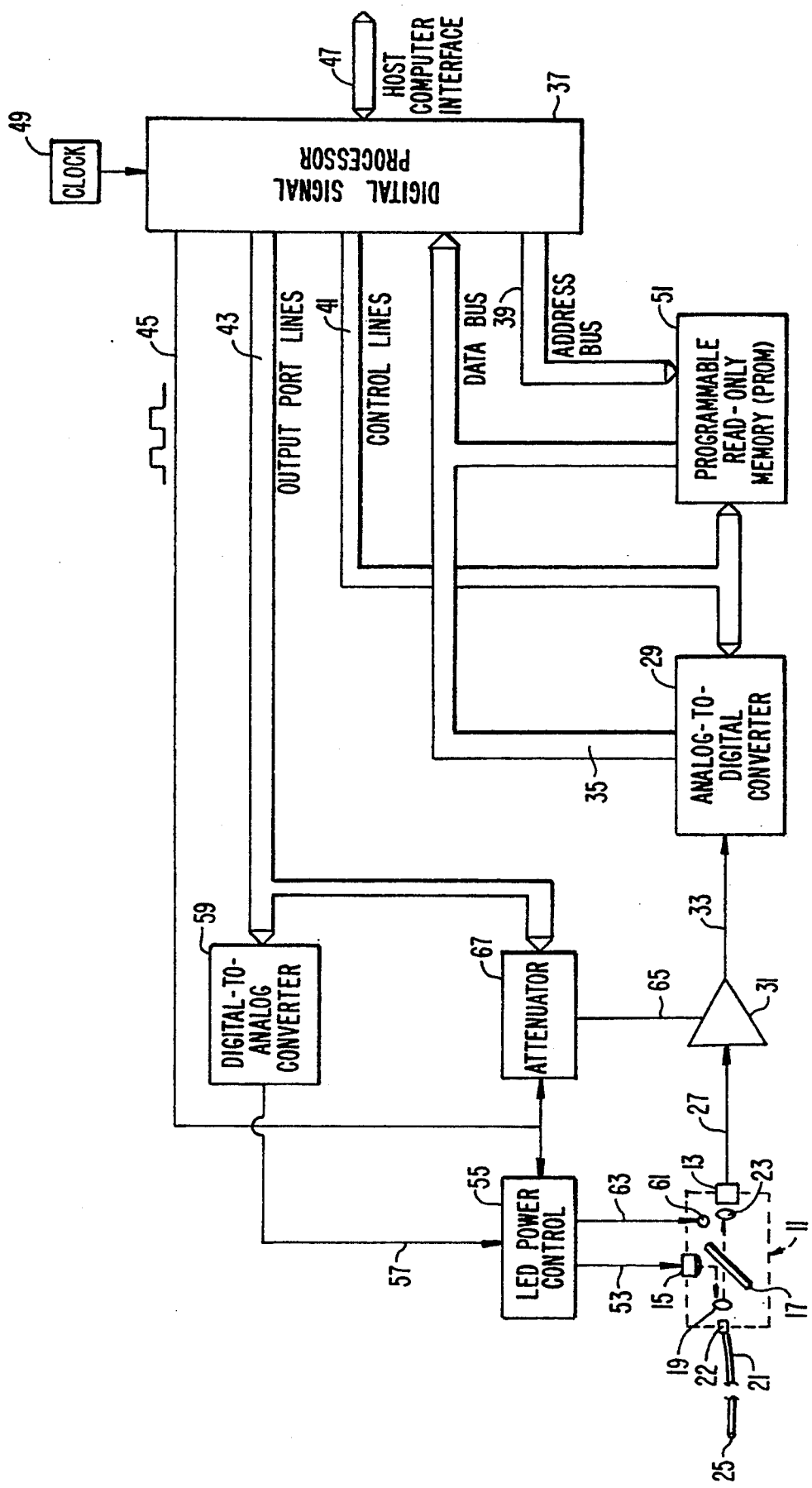
FIG. 1 schematically illustrates cooperating electronic and optical components of a measuring system according to a preferred embodiment.

Referring initially to FIG. 1, an optical head 11, the physical characteristics of which are described hereinafter with respect to FIG. 6, includes a photodetector 13, such as a photodiode or photo-multiplier, and a light emitting diode (LED) 15 as an excitation source. For the exemplary system being described, the LED 15 is a source of light within the red region of the visible spectrum, having a peak intensity around 650 nanometers (nm) in wavelength. Such an LED is commercially available from the Hewlett-Packard Corporation, part number HP8104. Its emitted light is reflected by a dichroic beam splitter 17, through a lens 19, and through an optical fiber connector 22 to an end of an optical fiber transmission medium 21. The optical fiber 21 delivers the light from the LED 15 to a luminescence based sensor of temperature or some other parameter, whose luminescence is returned to the optical block 11, through the beam splitter 17 and a lens 23 before striking the detector 13. The detector 13 may be, as an example, a fast response time silicon photodiode part number S2618K from Hamamatsu Corporation. Since the excitation and luminescent wavelengths of the luminescence-based sensor are separated, the dichroic beam splitter 17 is designed to reflect a majority of the excitation radiation from the LED 15 while transmitting a majority of the luminescence radiation to the photodiode 13. Because of the electronic signal processing utilized, as described below, no filter is required in front of the photodetector 13, thus eliminating its inherent attenuation of some of the optical signal of interest.

The optical fiber medium 21 can communicate with a number of forms of luminescence-based sensors. A form illustrated in FIG. 1 is the provision of such a sensor 25 as part of a probe carried at a free end of the optical fiber medium 21. Such a probe is generally formed by attaching powdered luminescent material to an end of the optical fiber medium 21 with an optically clear binder. Alternatively, the luminescent material of the sensor may be attached to a surface whose temperature or other parameter is to be measured. A free optical fiber end is then positioned to direct excitation radiation onto the luminescent material and receive the resulting luminescence back from it. The optical fiber medium end can remain spaced a distance apart from the coated surface or allowed to contact it. In the case of a large separation, auxiliary light collecting optics, such as lenses or mirrors, may have to be used to image the fiber end onto the surface.

The optical fiber medium 21 can be a bundle of fibers, but is preferably a single optical fiber. Indeed, one of the advantages of the system being described is that very small, single fibers may be extended for a long distance from the optical block 11 to the luminescence-based sensor, and still provide enough signal for the measuring system of FIG. 1 to accurately extract a measurement of temperature or other parameter. Any type of optical fiber may be used, rather than being restricted to the more expensive and fragile fused silica optical fibers.

Figure 5:
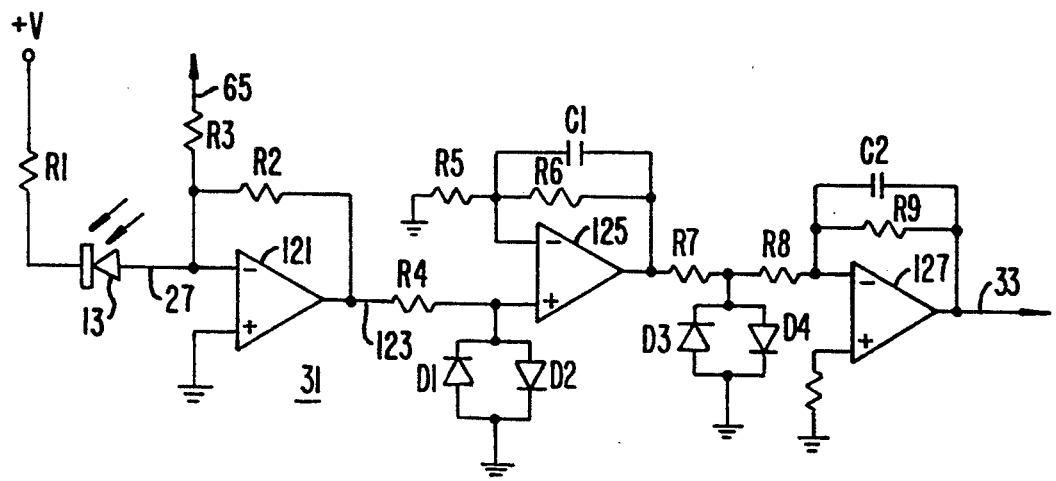
FIG. 5 is a schematic electronic diagram of an analog amplifier of the measurement system of FIG. 1.

An analog signal output in a line 27 from the photodetector 13 is desired to be digitized by an analog-to-digital converter 29 with as few components inbetween as possible to reduce inherent noise generation and bandwidth restrictions. However, some analog amplification is generally required so that the analog-to-digital converter 29 has enough signal to operate properly. Accordingly, an input amplifier 31 is utilized, generating in a line 33 an amplified version of a time varying signal output of the photodetector 13. A preferred circuit for the amplifier 31 is shown in FIG. 5 and described hereinafter.

A digital representation of the amplified photodetector signal is outputted by the analog-to-digital converter 29 onto a system data bus 35. This is the data bus of a signal processor 37. A preferred off-the-shelf digital signal processor is part number ADSP2111 of Analog Devices, Inc. This single integrated circuit chip signal processor includes connections for a separate address bus 39 and various peripheral chip control lines 41. Two output ports are provided, one of which is connected to lines 43. Various other output connections are made possible, one of which is attached to a conductor 45. This particular signal processor also has connections for interfacing with a host computer, such as through an interface bus 47. The signal processor 37 appears to a host computer as a peripheral device.

Alternatively, if a separate host computer interface 47 is not desired, a less expensive part number ADSP2105 signal processor of Analog Devices, Inc. can be utilized. This latter signal processor does not have provisions for a host interface but a second output port can be engineered into the system, which, unused in the system of FIG. 1, can be used to communicate with a host computer or other utilization device. In either case, a separate system clock 49 is employed.

The commercial types of signal processors identified above include a significant amount of random access memory (RAM), enough for the measurement system being described, so external RAM chips are not required. A programmable read-only memory (PROM) 51 is utilized, however, and is connected to both the data bus 35 and the address bus 39. The system operating program is contained within the PROM 51. Signal processor 37 operates, upon power-up, to load the contents of the PROM 51 into its own internal RAM.

The system being described operates to excite the sensor to luminescence by repetitively pulsing the luminescent material with excitation radiation. Inbetween pulses, characteristics of the decaying luminescence are then measured as an indication of the desired temperature or other parameter reading. Pulsing current is supplied to the LED 15 through a circuit 53 from power control circuits 55. The power control circuits 55 have two inputs. One is on line 45 from the signal processor 37. This line contains a square wave signal that specifies the duration and frequency of the light pulses emitted by the LED 15. The intensity of those pulses is controlled by an analog signal in a line 57 that is the output of a digital-to-analog converter 59. The level of the analog signal in the line 59 is set by a digital signal in the lines 43 from an output port of the signal processor 37. By controlling the intensity output of the pulses of the LED 15, the intensity of the resulting luminescent signal returned to the photodetector 13 is controlled in order to maintain it substantially uniform.

An optional second LED 61 is illustrated as part of the optical head 11 and driven by current in a line 63 from the power control circuits 55. The LED 61, if used, is chosen to have a wavelength output that does not excite the luminescent sensor but to which the photodiode 13 is sensitive. The purpose of the LED 61 is for internal testing of the electronic system, as described more fully hereinafter. For such testing, it is desired that there by no luminescent signal from the sensor. The power control circuits 55 periodically pulse the LED 61 in accordance with the signal in line 45. The digital-to-analog converter 59 is conveniently chosen to be of a type with an output 57 that can be driven both positively and negatively by the appropriate digital signal input in the lines 43. The power control circuits 55 are then designed to utilize that feature so that a positive going signal in the line 57 causes one of the LEDs 15 or 61 to be pulsed with an intensity proportional to the value of that signal, while a negative-going pulse causes the other of the LEDs to be energized. Only one of the LEDs 15 or 61 is energized at one time.

Although the optical head 11 is designed to minimize the amount of light output of the LED 15 that strikes the photodetector 13, it is nearly impossible to prevent all such stray light from reaching the photodetector 13. Some excitation wavelengths are transmitted back through the beam splitter 17. These wavelengths are reflected off the sensor, fiber ends and connectors, and are thus present to some degree in the signal returning to the photodetector 13. Although measurement of temperature or other parameter is made only during intervals between pulses when the LED 15 is turned off, it is desirable to avoid driving the amplifier circuits 31 to a high level during the LED 15 excitation pulses. This is because of the amplifier's power rail saturation recovery time. Therefore, a signal is provided in a line 65 to the amplifier circuits 31 from an attenuator circuit 67. The attenuator 67 receives the same pulse signal in the line 45 and intensity level signal in the lines 43 as used to control the LED 15. Accordingly, the timing and amount of attenuation of the signal entering the amplifier circuits 31 is desirably controlled during the luminescent sensor excitation pulses.

Figure 2A:
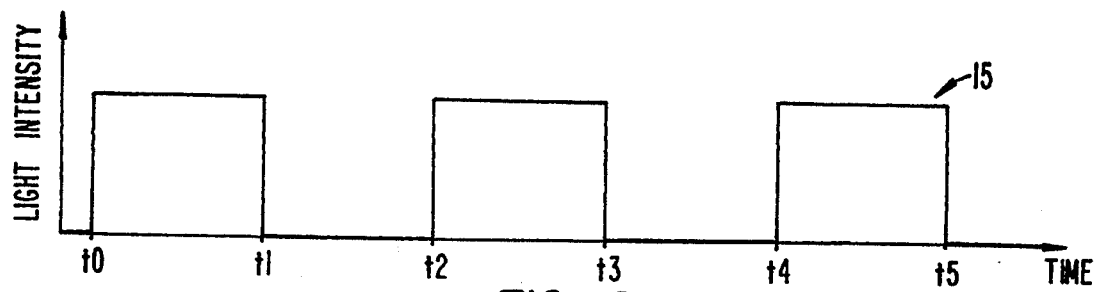
FIGS. 2A–2E illustrate the operation of the system of FIG. 1 by showing various exemplary optical and electronic signals thereof as a function of time.

Referring to the waveforms of FIG. 2, some aspects of the operation of the system of FIG. 1 will be explained. FIG. 2A shows the excitation light pulses of the LED 15. Between times t0 and t1, the LED 15 is being pulsed to direct its excitation light against the luminescent-based sensor. Between times t1 and t2, the LED 15 is turned off. These pulses are periodically repeated so long as the measurement is being made. A fifty percent duty cycle of pulses is illustrated.

Figure 2B:
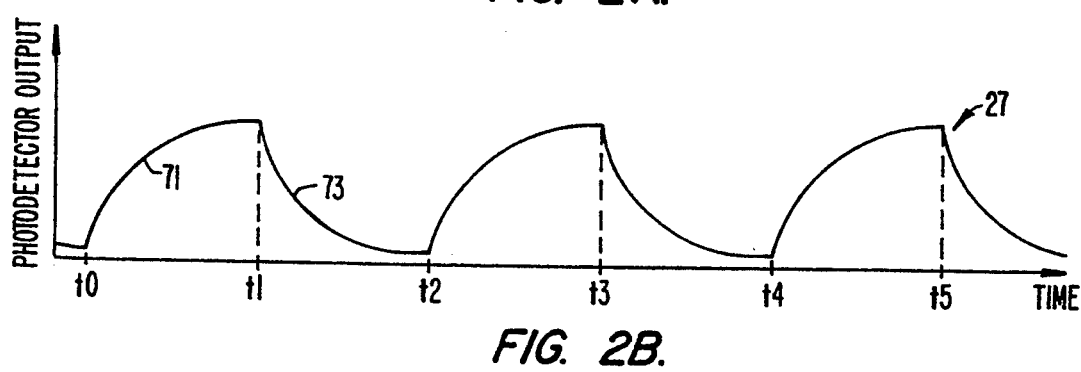

The luminescent signal response of the sensor to the excitation signal of FIG. 2A is shown in FIG. 2B. For the duration of an excitation pulse, the output luminescence increases in intensity, as indicated by a curve 71 during the excitation pulse occurring between times t0 and t1. As soon as the LED 15 is turned off, at time t1, the sensor luminescent intensity begins to drop. During the time between pulses, between times t1 and t2 of FIG. 2B, a declining signal 73 is observed by the photodetector 13. The excitation pulse, between times t0 and t1, is made to be long enough to allow the sensor luminescence to substantially reach a maximum for the given excitation intensity. The luminescent material is preferably chosen to be of a type whose luminescence 73 decays exponentially. This makes it much easier to measure the changes in rate of decay that occur as a function of temperature or other parameter being measured by the sensor.

The signal of FIG. 2B is indicated to be an electrical output of the photodiode 13. That output does faithfully follow the changing intensity level of the luminescence striking it if selected to have a high bandwidth. Such photodiodes are commercially available, having been developed primarily for communications applications. It is only when that signal is passed through the amplifying circuits 31 that some distortion takes place because of a lower bandwidth of those circuits. It should also be noted that FIG. 2B displays only the rising luminescence signal 71 during the time that the LED 15 is turned on. The effect of output radiation from the excitation LED directly striking the photodiode 13, as discussed previously, has been ignored in FIG. 2B for purposes of explanation.

The portion of the signal containing the information of temperature or other parameter being measured is the decaying portion 73. This is measured after each excitation pulse. A number of such measurements are then averaged to eliminate the effects of noise. The averaged decaying function is then analyzed to measure its characteristic from which the temperature or other parameter is determined.

Figure 2C:
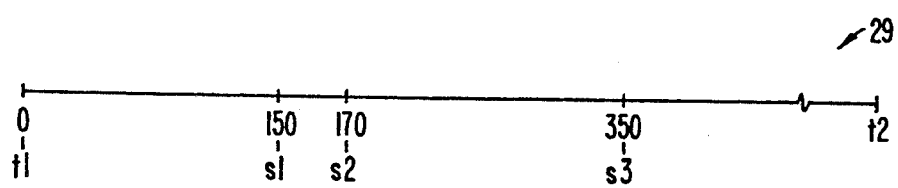

Referring to FIG. 2C, an example of operation of the analog-to-digital converter 29 is illustrated. Its operation between the intervals t1 to t2 is shown in an expanded form. The analog-to-digital converter 29 samples the decaying analog signal at a repetitive rate, beginning at time t1. But it is only during the interval between samples s1 and s3 (samples 150 and 350, respectively, in this specific example, where one sample is taken each 1.36 microseconds) that the data is utilized. This provides a fixed period of time from time t1 until sample s1 is taken for the amplifying circuits 31 to respond. Sampling is stopped at sample s3 (number 350 in this example) where the intensity of the curve 73 is getting quite low.

The curve 73 as digitized after passing through the amplifier circuits 31 can be represented as follows:

$$Ae^{-at} + C \qquad (1)$$

where "C" is an offset signal generated by the photodetector and amplifying circuits 31, "e" is a natural logarithm, "t" is time, "a" is a negative reciprocal of the time constant of the exponentially decaying curve, and "A" is a beginning value of the exponentially decaying signal.

Figure 2D:
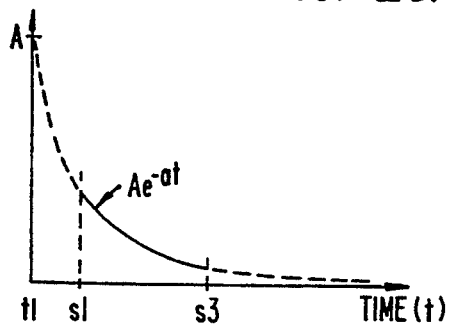

The processing accomplished by the signal processor 37 first gathers a large number of sets of digital data taken from the middle of the exponentially decaying signals and combines them into a single signal, as illustrated by the solid portion of the exponential curve of FIG. 2D. In the course of this combination, a measured value of offset C is subtracted. This thus leaves a composite function as follows:

$$Ae^{-at} \qquad (2)$$

Figure 2E:
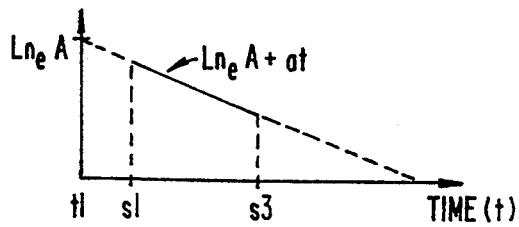

It is the quantity a, being the negative inverse of the time constant $\tau$, that is desired to be measured. This can be accomplished by the signal processor 37 by use of any number of known curve fitting techniques where parameters of an exponential are altered until that exponential matches the composite acquired signal of FIG. 2D. A least squares technique is useful for this. But it is less computational intensive, and thus faster, if a natural logarithm of the composite signal of FIG. 2D is first calculated, as shown in FIG. 2E, since it results in a straight line which is much easer to fit by standard curve fitting techniques. The log function of FIG. 2E is represented by:

$$Ln_e A + at \qquad (3)$$

Here, the desired value a is the slope of the straight line and more easily calculated.

Rather than calculating the quantity a from a composite set of digital data, it can alternatively be calculated from each set of digital data acquired for one decaying signal and then several of them averaged. This requires a higher calculating speed than is required for the averaging technique described in detail herein but may be desired in certain circumstances.

Figure 3:
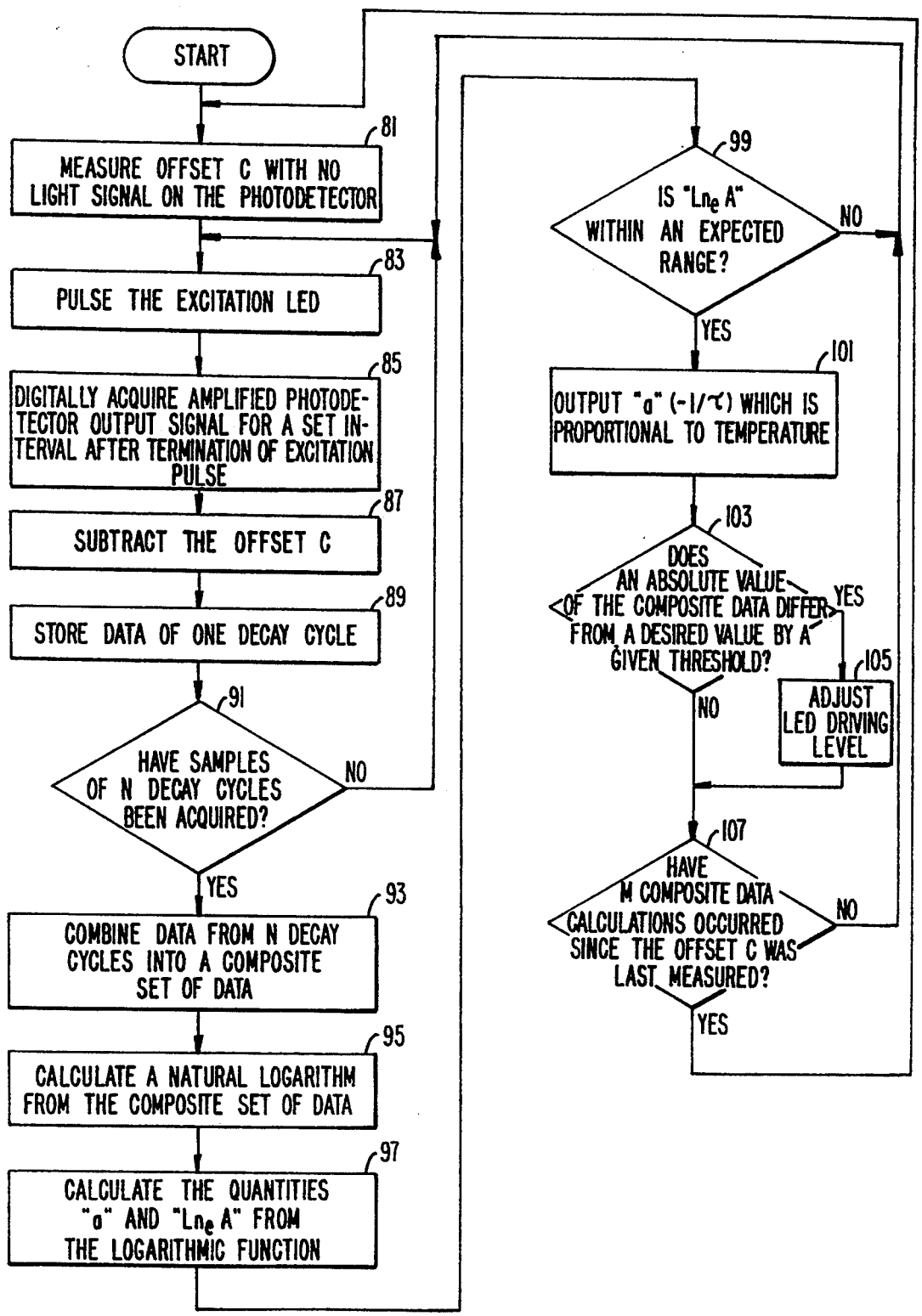
FIG. 3 is a flow chart that sets forth a preferred sequence of operation of the system of FIG. 1.

Operation of the system of FIG. 1 is more completely illustrated in the flow chart of FIG. 3. The techniques discussed with respect to FIG. 2, plus related operations and calculations, are illustrated in the process of FIG. 3. This process is controlled by the computer program stored in the PROM 51.

A step 81 of FIG. 3, specifying the measurement of the offset C, occurs periodically as the system is operating and is described below. A step 83 is a first step in one cycle of operation of the instrument, namely the emission of one excitation pulse of a type illustrated in FIG. 2A. A next step 85 is to digitally acquire the signal 73 of FIG. 2B, as explained with respect to FIG. 2C. As explained earlier, this results in 200 samples of the decaying signal which are acquired. A next step 87 is to subtract the offset C from those samples. This is followed by storing the corrected data samples in RAM of the signal processor 37, as indicated by a step 89.

Digital data for one cycle has then been stored. In the case where the data for a number of cycles are combined to provide a single quantity proportional to temperature or other parameter being measured, this process is repeated a number N times. A step 91 causes the process to repeat the data acquisition cycle just described until it has been done N times. After that, as indicated in a step 93, data from N number of cycles is combined by averaging into a single set of data. This composite acquired signal is illustrated in FIG. 2D.

A next step, in order to simplify calculation of a time constant of this composite signal, is, as indicated at 95, to calculate a natural logarithm of the composite set of data, the results of which are illustrated in FIG. 2E. A next step 97 is to calculate the desired quantity a which is a measure of the composite acquired signal time constant, proportional to temperature or other parameter being measured. In addition, the logarithm of the starting point A of the composite decaying signal ($Ln_e A$) is calculated for the purpose of checking the results of the A calculation.

The calculation of parameters of a curve by so-called curve-fitting techniques are well-known. For example, Press et al., *Numerical Recipes—The Art of Scientific Computing*, Cambridge University Press (1986), pages 498–520 of Chapter 14, describe such techniques generally and even provide specific computer programs for carrying them out. This book portion is incorporated herein by this reference. The curve-fitting techniques initially discussed can be applied directly to the composite set of data formed by step 93, but, as previously mentioned, is a much easier and quicker calculation to do so, in step 97, on a linear set of data that results from the logarithmic calculation of step 95. Step 97 involves calculation of the two constants $Ln_e A$ and a of equation (3) given above, as illustrated in FIG. 2E.

The calculated beginning point of the decaying curve, $Ln_e A$, is calculated so that it may be used in an optional step 99. This is a quantity that is not measured since no data are acquired from the decaying intensity curve immediately at the end of an excitation pulse. If there are known changes in operation of the system, such as a sudden increase in the intensity of the excitation light from the LED 15, the quantity $Ln_e A$ can be monitored to see if it appropriately changes in a next cycle. This quantity is independent of the temperature or other parameter being measured. But if it is detected that this quantity does not change as might be expected, such as by suddenly increasing the intensity of the LED 15, then it will be known that the composite data just acquired and analyzed is likely not accurate. Such a circumstance could indicate that the amplifier 31 has been driven into saturation.

In such a case, the data will be rejected and the processing commenced again with step 83. However, if no problem is detected with the data, the value of the quantity a is used to calculate temperature or some other parameter being measured, as indicated in a step 101. The quantity a can be converted directly to temperature, for example, by use of a look-up table for the particular luminescent material being utilized as a temperature sensor.

In order to maintain the signal levels in the photodetector 13 and amplifier 31 as high as possible without operating them in saturation or other non-linear operating range, the intensity of the LED 15 excitation pulses is controlled as part of a feedback loop from the output. As previously mentioned, the digital-to-analog converter of FIG. 1 designates the current level that the power control circuits 55 will provide the LED 15, and thus control its intensity. That intensity is set by a digital value in the port lines 43. If the output signal is below a desired threshold, then the intensity of the LED 15 is increased. Conversely, if the output is higher than a given threshold, then the intensity of the LED 15 is decreased.

In order to determine whether the output signal level is within range or not, the absolute value of one region of the composite acquired signal curve of FIG. 2D is compared with a given threshold. That region is preferably taken immediately after valid data samples are taken in the digitization process. Referring to FIG. 2C, the data points between samples s1 and s2 are utilized for this purpose.

Thus, referring again to FIG. 3, the processing makes that comparison for that part of the composite data put together, in a step 93. If that value is outside of a specified range, a step 105 occurs of adjusting the LED 15 intensity by changing the driving intensity number in lines 43 of FIG. 1.

A final step 107 in the processing of FIG. 3 determines whether another N cycles of decay curves are to be acquired and analyzed, beginning with step 83, or whether the offset C is again measured before doing so, by step 81. The offset C is measured periodically, every M cycles. This calculation does not have to be done very often, perhaps only every ten minutes or so, but when performed, the step 81 operates in a similar mode as described when acquiring data, except that the LED 15 is not pulsed. The step 83 is omitted. Of course, the offset subtraction step 87 is also omitted. Otherwise, the step 81 operates similarly by acquiring digital data of the amplified output of the photodetector 13 for N cycles. These data are averaged in order to calculate a new offset C that is used in subsequent data acquisition cycles.

Many specific luminescent material compositions can be utilized for the sensor in the system being described, depending upon a temperature range of interest and other factors particular to specific applications. The material must be stable over time and up to temperatures in excess of those to be measured. The chosen luminescent composition also needs to be strongly absorptive of the radiation output of available LEDs, and emit luminescent radiation in wavelength ranges to which available high bandwidth (fast responding) photodetectors are available. The luminescent sensor composition chosen should also, be easily reproducible in order to reduce variations in characteristics between different sensors. It is often desirable to substitute sensors for use with a single measuring module without having to recalibrate that module to take into account different sensor characteristics. The luminescent material preferably has a decay time constant in a range of from one microsecond to one millisecond. Within this range, the requirements placed on the electronic system are not too severe, yet repeated measurements can still be made with a sufficiently high rate.

Figure 4A:
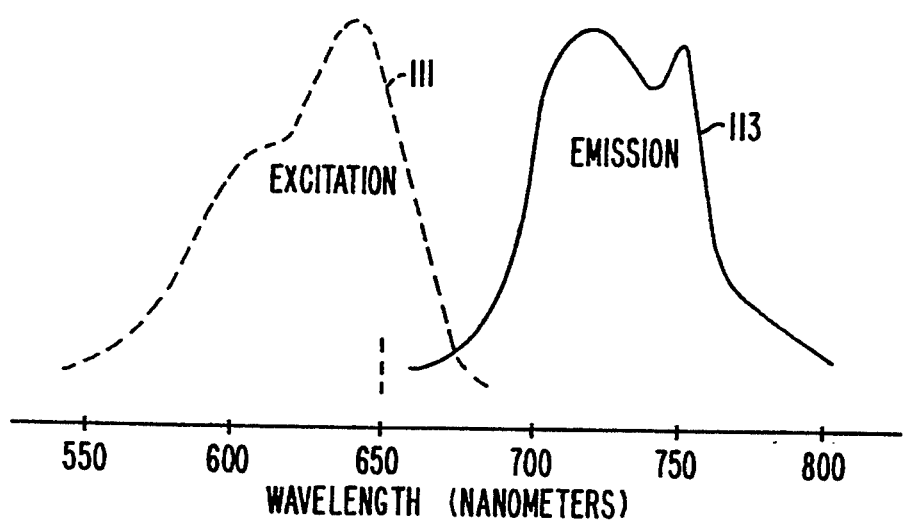
FIGS. 4A and 4B are curves which show the characteristics of a preferred luminescent material for use with the measurement system of FIG. 1.
Figure 4B:
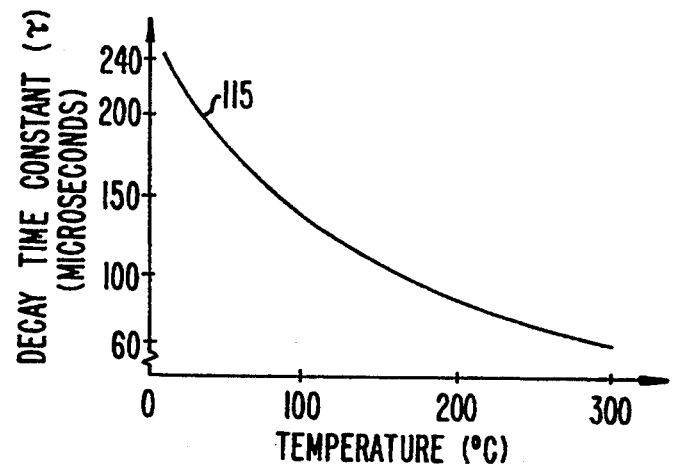

A preferred luminescent material for most applications is a chromium-activated yttrium gallium garnet having a specific composition $Y_3(Ga_{1-x}Cr_x^{+3})_5O_{12}$, where X lies substantially within a range of 0.032 to 0.078, representing a concentration of the trivalent chromium activator of from 2.0 to 4.5 percent by weight. FIG. 4A shows this material's absorption spectra 111, in the red, and its emission spectrum 113, in the near-infrared. The excitation radiation absorption spectrum 111 has a peak near the peak emission intensity wavelength of the chosen LED 15. The emission spectrum 113 corresponds with the spectral sensitivity of available fast silicon photodiodes that can be used for the photodetector 13. The decay time constant $\tau$ of the emission of this luminescent material is the function of its temperature as illustrated in FIG. 4B. Its $\tau$ is typically within a range of 190 to 250 microseconds when the luminescent material is at room temperature (approximately 20° C.). As can be seen from FIG. 4B, the decay time constant varies from about 280 microseconds at 0° C. to around 60 microseconds at 300° C. The sensitivity of the measurement over this temperature range is good, another requirement of a satisfactory luminescent material sensor. The curves of FIG. 4 show the characteristics of the trivalent chromium activated yttrium gallium garnet luminescent material with the x of the chemical formula given above being substantially 0.47, representing a concentration of about three percent by weight of trivalent chromium.

An advantage of the opto-electronic system described above is that it can work with a luminescent material having a short decay time. The preferred material whose characteristics are illustrated in FIG. 4B have decay time constants significantly less than one millisecond for a full temperature range of interest, such as −190° C. to +400° C. Luminescent materials with time constants to be measured that are less than one or two milliseconds create greater demands on the opto-electronic measurement system utilizing them. However, when such short decay times can be handled, as they are with the system described herein, there is an advantage in that a large number of decay time measurements may be taken in a very short period of time. In the specific system being described, digital samples of the decaying signal, as illustrated in FIGS. 2B and 2C, are taken one microsecond apart. The pulse repetition rate of the excitation signal shown in FIG. 2A is in excess of 100 pulses per second. The factor N in step 91 of FIG. 3 can easily be 100 or more for most applications. That is, 100 decay time cycles are measured and averaged together to form a single average decay time constant from which temperature or other parameter can be determined. Thus, a time constant is calculated about once each second, that calculation resulting from an average of about 100 individual decay time measurements. Providing a new measurement every second provides a real time monitoring of temperature or other parameter that is required in many applications without having to sacrifice the noise reduction that results from averaging a large number of samples.

Another specific luminescent material that is suitable for many applications is a trivalent chromium doped yttrium aluminum garnet, having a chemical formula of $Y_3(Al_{1-x}Cr_x^{+3})_5O_{12}$, where x lies within a range of 0.16 to 0.060, representing a concentration of trivalent chromium dopant of from one to four percent by weight. This material has a luminescence that is less bright than that of the preferred material described above, and has a much longer time constant, which makes it suitable for high temperature measurements. Its excitation, absorption and luminescent spectra are, however, quite similar.

Trivalent chromium doped rare earth aluminum borate materials are also useful in the system being described. Found to have excitation, absorption and luminescent emission spectra similar to the preferred material described above, and with the same or greater luminescent brightness, and with a shorter decay time constant, are certain yttrium aluminum, gadolinium aluminum and lutetium aluminum borates. Examples are chemical compositions $Gd(Al_{1-x}Cr_x^{+3})_3(BO_3)_4$ and $Lu(Al_{1-x}Cr_x^{+3})_3(BO_3)_4$, where x is generally in the range of form 0.01 to 0.04.

FIG. 5 shows a circuit diagram of a preferred amplifier 31 in the system of FIG. 1. A primary goal in this design is to satisfactorily trade off the amount of noise generated by the amplifier with a desired wide bandwidth. Generally, if such an amplifier is designed to have a wide bandwidth, it will also necessarily generate a significant amount of noise. A wide bandwidth is required in order to pass the high frequency components of the decaying luminescent intensity as detected by the detector 13. Stated another way, the amplifier 31 needs to have a good impulse response. The circuit of FIG. 5 provides good response at sufficiently high frequencies without generating an unacceptable level of noise for providing temperature readings at one second intervals within a precision of 0.1° C.

One feature that reduces noise is a reduction of the capacitance of the photodiode 13 by reverse biasing it with a connection of its cathode to a positive voltage supply through a resistor R1. The cathode is normally connected with ground potential. Such reverse biasing is usually employed to increase the bandwidth response of the photodiode, but that is unnecessary in this application since available photodiodes are fast enough without it.

The anode of the photodiode 13 is connected by line 27 to an inverting input of an operational amplifier 121 which operates to convert current through the diode 13 into a proportional voltage in an output 123. A preferred amplifier is part No. OPA627 of Burr Brown. It is a dielectric insulated, low-noise, field effect transistor amplifier having a very high input impedance, low drift and a low input bias current. A value of a feedback resistance R2 is chosen to lie within a range of from about 5 megohms to about 20 megohms in order that it have a desired wide bandwidth. The bandwidth of the amplifier increases linearly with the value of the feedback resistance R2. The amount of noise generated by the amplifier 121 increases as a square root of the value of the resistance R2. Thus, this resistance is kept as low as possible consistent with a desired bandwidth in order to minimize the noise. A specific value utilized is 10 megohms.

Another effect of keeping the feedback resistance R2 low is that its amplification is reduced. If R2 is made high enough, only the amplifier 121 would be required, but the noise level would be unacceptable for this system. Thus, the voltage output in the line 123 is further amplified by two additional series connected voltage amplifier stages. A first stage utilizes an operational amplifier 125 and a second stage utilizes an operational amplifier 127. The output 123 is connected through resistance R4 to a non-inverting input of the amplifier 125. A pair of Schotky diodes D1 and D2 connected between the non-inverting input of the amplifier 125 and ground prevents a high voltage from reaching the amplifier 125 and saturating it. An output of the amplifier 125 is connected through series resistances R7 and R8 to an inverting input of the amplifier 127. A similar arrangement of voltage limiting diodes D3 and D4 are also provided at the input to the second stage amplifier 127.

In this particular implementation, the operational amplifiers 125 and 127 may each be part Nos. OPA27 from Burr Brown. The feedback network between an output of the amplifier 125 and its inverting input is chosen to give a gain of about 10. A feedback network of R9 and C2 of the amplifier 127 provides for a gain of this final stage of about 15.

In order to reduce the gain of the first amplifier stage 121 during period when the LED 15 is being pulsed, the inverting input of the amplifier 121 is connected through a resistance R3 to the attenuator circuits 67 of FIG. 1 through line 65. During the times that the luminescent decay signal is being followed by the amplifier circuit 31, the conductor 65 is unconnected and thus does not affect operation of the circuit. But, as described previously with respect to FIG. 1, it is connected to ground through the variable attenuator 67 during excitation pulses. This prevents overdriving the amplifier stage 127 during such pulses.

Figure 6:
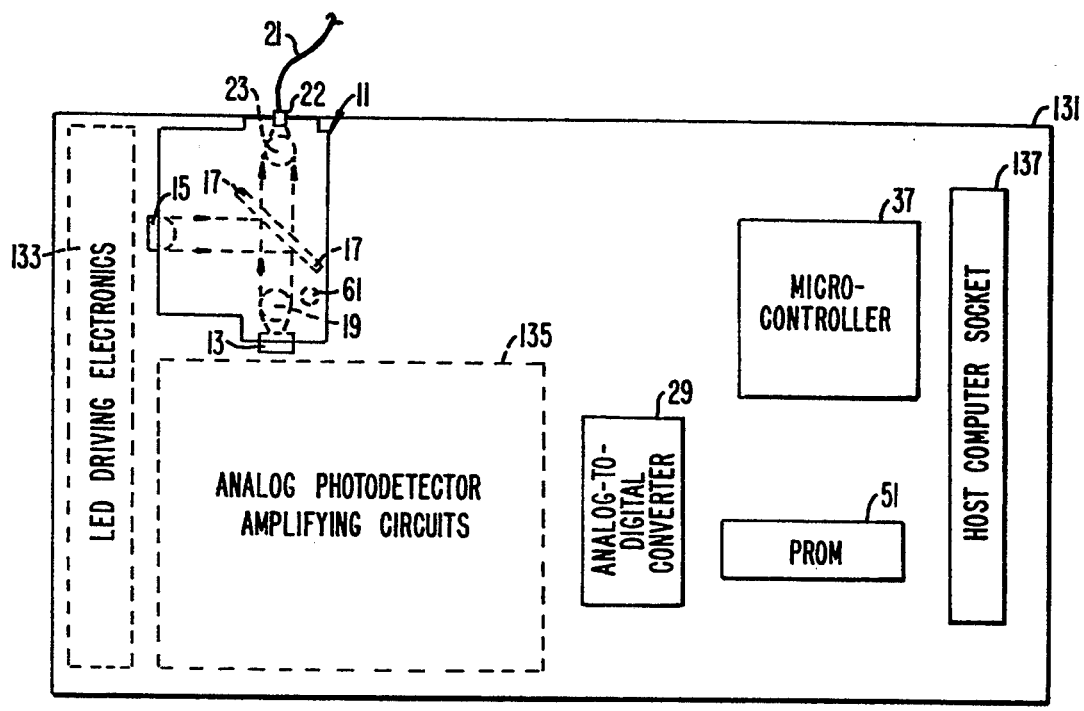
FIG. 6 illustrates a physical printed circuit card implementation of the measuring system of FIG. 1.

Referring to FIG. 6, a physical layout of the optical and electronic components of the system described with respect to FIGS. 1-5 is shown. A standard printed circuit card 131 carries all of the optical and electronic components described. This board may be as small as five inches long and three inches wide. The optical head 11 is mounted directly onto the circuit board 131. A number of components, including the digital-to-analog converter 59 and LED power control circuits 55, are positioned in an area 133 adjacent the optical head 11 on a side where the LED 15 is mounted. Similarly, components for the amplifier 31 illustrated in FIG. 5 are mounted in an area 135 immediately adjacent a side of the optical head 11 to which the photodiode 13 is mounted. The analog-to-digital converter component 29 is positioned adjacent the components 135. A socket 137 provides for the host computer interface connection 47. As discussed earlier, the temperature or other parameter ultimately desired to be determined may either be fully calculated on the board 131 and outputted through the socket 137, or can be calculated by the host computer from the value "a" communicated through the socket 137 from the board 131.

In order to provide a low-cost, small printed circuit board as described in FIG. 6, the structure of the optical head 11 is important. The head 11 is preferably machined from a block of aluminum to open up passages therein for holding the optical elements shown in FIG. 6 and provide for the indicated light paths between them. The lenses 19 and 23 are preferably in the shape of spheres in order to provide a short focal length and thus allow the dimensions of the optical block 11 to be minimized. The LED 15 is preferably chosen to be of a type that has such a lens integrally formed as part of it. Difficulties that are often encountered with alignment of lenses in an optical system being manufactured are not encountered in this structure since it is insensitive to the orientation in which the totally spherical lenses 19 and 23 are mounted. All that is necessary is for a seat to be machined in the block of aluminum. A retaining surface is also provided for the beam splitter 17 by hollowing out the interior of the block from a side opposite to that where the LED 15 is mounted. By providing such a precisely dimensioned block so that the optical elements need only be fit into place and retained without additional adjustment, the manufacturing time and cost are significantly reduced from that of previous optical heads used in similar applications.

Even with the amplifier 31 being designed to have a high bandwidth, some high frequency components of an initial portion of the luminescent intensity curve are attenuated and not amplified by it. This is a reason for the delay described with respect to FIGS. 2C and 2D in acquiring data of each luminescent decay cycle. If that bandwidth can be increased without the accompanying unacceptable amplifier noise being increased, then the luminescent decay measurements can be started earlier when the intensity of the luminescent signal is desirably greater.

A technique may optionally be implemented in software to accomplish this in the system being described, as illustrated in FIG. 7. FIG. 7A shows a typical luminescent intensity exponential decay while the curve of FIG. 7B shows a typical response of a bandwidth limited analog amplifier. A step function input, with very high frequency components, causes such an amplifier's output to look something like that of FIG. 7B, gradually increasing from a beginning of the impulse at time $t_A$ until it reaches its full output level at some time $t_B$ later. The result is an output of the amplifier, as shown in FIG. 7C, that provides a representation of the luminescence intensity of FIG. 7A that is quite distorted. Measurement of the luminescent decay time by measuring the decay of the amplifier output signal of FIG. 7C can begin only after time $t_B$.

Figure 7A:
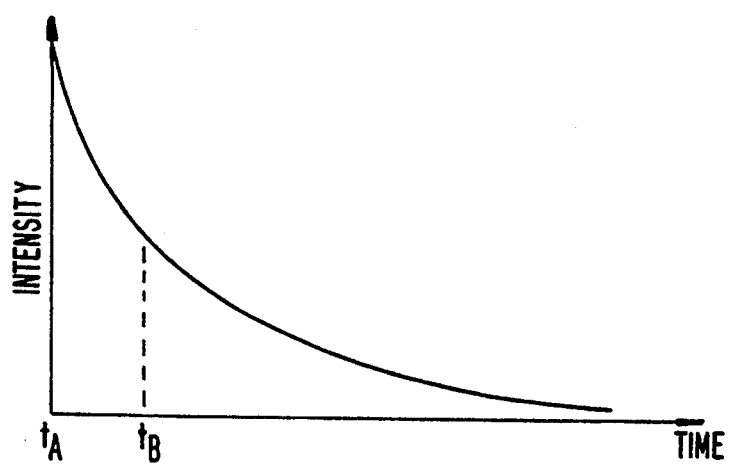
FIGS. 7A–7D are curves that illustrate an optional correction that can be made by the system of FIG. 1 to overcome electronic component impulse response limitations.
Figure 7B:
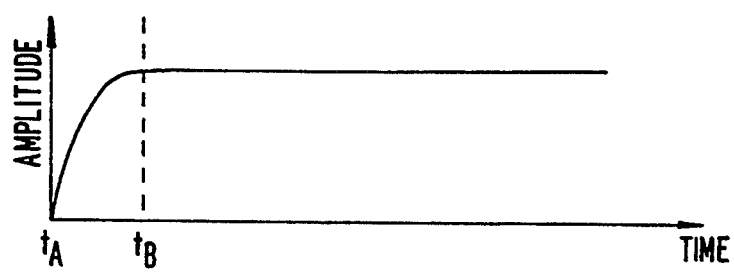

However, a correction may be implemented in software to provide an amplifier output signal that more nearly matches in shape the luminescent intensity input signal of FIG. 7A. The second light emitting diode 61, as shown in FIGS. 1 and 6, is provided for this purpose. This impulse response of the amplifier 31, as shown in FIG. 7B, is periodically measured by pulsing the LED 61 in order to provide a similarly-shaped electronic pulse in the line 27 as an input to the amplifier 31. Since the wavelength output of the LED 61 is chosen such that the luminescent sensor is unaffected, its output light pulse is the only optical signal detected by the photodiode 13 during this testing operation.

Figure 7C:
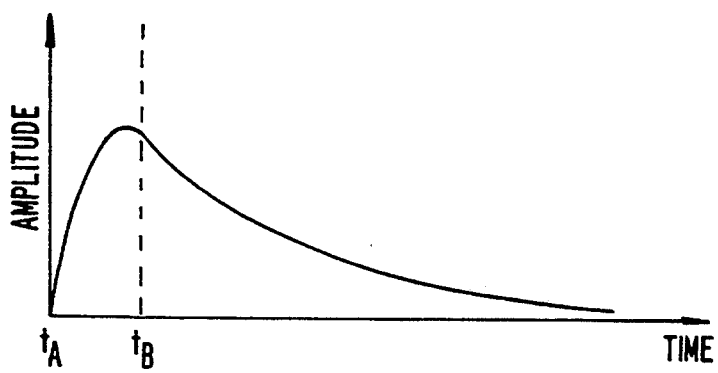

Once the impulse response of FIG. 7B of the amplifier is measured and stored in memory, the acquired amplifier signal of FIG. 7C is corrected by dividing that signal with the measured impulse response of FIG. 7B. That then corrects for the limited bandwidth of the amplifier and converts its bandwidth-limited output decaying signal into one which can be measured by the techniques described above beginning almost immediately after termination of each excitation pulse. Greater luminescent intensity is thus made available. This has the effect of increasing the signal-to-noise ratio, and/or allowing the system to be used in situations where a lower light signal is available, such as occurs when smaller diameter or longer length optical fibers are utilized. It also allows extension of the measurement to higher temperatures for which the decay time is otherwise too short to measure.

Figure 7D:
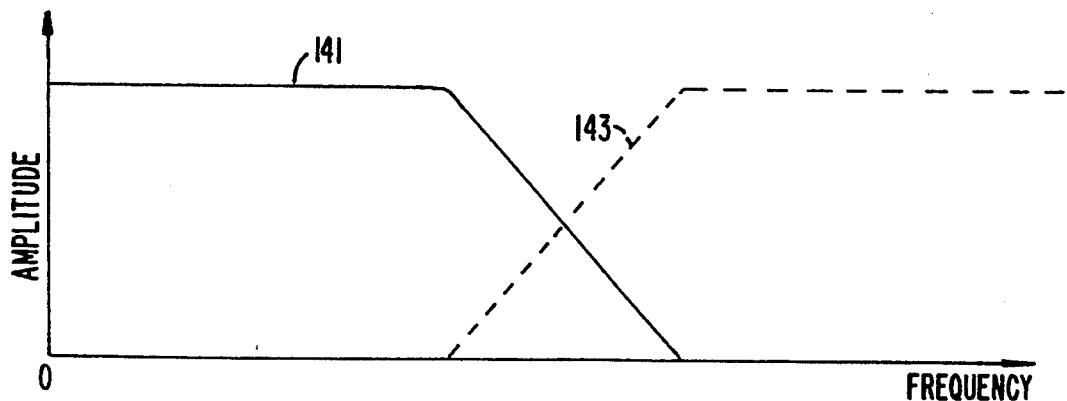

FIG. 7D shows the effect of such compensation in the frequency domain. A curve 141 shows a frequency response of a typical amplifier, rapidly falling off after an excess of some frequency. A dashed line 143 shows the frequency response of the amplifier that is effectively added back by the software multiplication of the amplifier impulse response with its output, as described above.

The system described has many advantages in a wide variety of specific temperature measurement applications because of its improved performance and reduced cost. In many applications, the luminescence signal from the sensor is significantly attenuated before reaching the photodetector of the measuring instrument. This occurs, for example, when an optical fiber signal path is extended through a container wall that must remain sealed. A special optical transmission element installed through the wall in a manner to maintain the wall's integrity introduces a signal loss at one or more connection interfaces with an optical fiber. Utility power transformers are an example of this, where an optical signal path is extended through the transformer outer tank wall to a sensor installed in the transformer windings. Another example is a processing chamber, such as that used in semiconductor manufacturing, where the optical signal path is extended into the chamber in order to measure the temperature of the semiconductor wafers being processed. High levels of attenuation also exist when the sensor is positioned a long distance away from the photodetector, such as in industrial processes where electrical components are not permitted to be close to the temperature sensor because of an explosive or other hostile atmosphere. Petrochemical processing is one such application.

The use of small fibers and a number of connectors in an optical fiber path, such as found in medical applications where a disposable temperature sensor is implanted in a patient's body, also attenuates the optical signal. In one such medical application, a sensor is implanted within a volume of tissue during hypothermia treatment of the patient. In another application, a sensor is positioned in a human body blood vessel during therapeutic procedures.

Further, weak luminescence signals are generally the best that can be obtained in some applications. For example, measurement of the temperature of a surface of a moving part coated with the luminescent material necessarily exhibits a weak coupling with an optical fiber or other optical system. A specific application where this occurs is in measuring rotor winding temperatures in a large motor or generator. The necessity that the optical fiber or other optical system not contact the moving surface results in an inefficient optical coupling between the sensor and photodetector. Further, the movement usually causes this coupling to be non-continuous, thus requiring that the measurement be made quickly before the observable luminescence disappears altogether.

The system and materials described above allow such difficult temperature measurements to be made with precision.

In addition, the techniques of this invention provide for long term stability which is required in many applications. One such application is where sensors are permanently installed in large transformers, generators or other utility equipment, and where they must continue to provide accurate temperature measurements for twenty, thirty or more years. The measurements made by the present system remain accurate even though changes will necessarily occur over time in many system components such as the excitation LED, the photodetector, the optical fibers, and the like.

This feature, combined with the efficient signal processing and compact electronics and optical head design, mounted on a single circuit card, allow use of luminescence based sensing in applications which were previously considered impractical. This capability will result in more such measurements being made, thus extending life of expensive equipment by forewarning of failure, allowing better control of manufacturing processes, resulting in better quality with higher yields, and similarly beneficial results. The compact and inexpensive single opto-electronic board can easily be installed as part of a larger instrument or system. Further, the cost of such a board level temperature sensing system is now becoming competitive with infrared radiometers and similar competing technologies.

The techniques and systems described herein are not limited to measurement of temperature as the ultimate parameter, although temperature measurement is an important application. The present techniques and systems also have application to the many situations where a temperature measurement is made as an intermediate parameter from which some other parameter is eventually determined. For example, electric current can be measured by providing a luminescent sensor on a current conductor that is resistively heated, so that the measured temperature of the sensor is related to the current magnitude being measured as the ultimate parameter. As another example, fluid flow can be measured by heating the sensor in contact with fluid by pulses of infrared radiation, such as from a laser diode, and measuring the pulse repetition rate required to maintain constant temperature rise above the fluid temperature, thus providing an indication of flow rate.

Also, the techniques and systems described herein can be used to directly measure parameters other than temperature which affect the rate of decay of a luminescence based sensor. An example is given in aforementioned U.S. Pat. No. 4,716,363, where the effect on the rate of luminescence decay by the level of concentration of free oxygen is used to measure that concentration.

Although the various aspects of the present invention have been described with respect to its preferred embodiments, it will be understood that the invention is entitled to protection within the full scope of its appended claims.

It is claimed:

1. An opto-electronic assembly for measuring a quantity related to a parameter, comprising the following formed on a single self-supporting substrate in the form of a printed circuit board:
   an optical assembly attached to said substrate and including a photodetector positioned along a first side of the optical assembly, a diode having a light radiation output positioned along a second side of the optical assembly and a length of optical fiber having one end terminating along a third side of the optical assembly, another end of the optical fiber communicating with an optical sensor that is characterized by transmitting radiation to said one end which is proportional to said parameter, said optional assembly including therein a dichroic beamsplitter positioned to reflect a majority of the diode output to said optical fiber one end termination and to transmit a majority of the sensor radiation from said optical fiber one end termination to said photodetector,
   a first group of electronic components carried by said substrate in an area adjacent said first optical assembly said and including means connected to receive an electrical output from said photodetector for amplifying said electrical output,
   a second group of electronic components carried by said substrate in an area adjacent said second optical assembly said and including means electrically connected to said diode for driving said diode.
   an electronic analog-to-digital signal converter positioned on said substrate adjacent said first group of electronic components and receiving an amplified photodetector output therefrom, thereby to provide a digitized amplified photodetector output,
   means carried by said substrate and connected with at least said second group of electronic components and said signal converter for synchronizing operation of the second group of electronic components and analyzing the digitized amplified photodetector signal in a manner to calculate the quantity related to said parameter, and
   a connector attached to said substrate and electrically connected with at least said synchronizing and analyzing means, thereby providing connectability of the assembly within a system wherein the parameter related quantity may be utilized to provide an indication of said parameter.

2. The assembly according to claim 1 wherein said optical assembly is contained within a block of substantial solid opaque material in a manner that said communicating optical system is substantially isolated from exterior light, and further wherein said optical system includes a first lens sphere carried by said block in a position adjacent said photodetector and a second lens sphere carried by said block in a position adjacent said optical fiber termination.

3. The assembly according to either of claims 1 or 2 which additionally comprises said optical sensor connected to optically communicate with said another fiber end, said sensor including a chromium activated garnet luminescent material in powder form.

4. The assembly according to either of claims 1 or 2 which additionally comprises said optical sensor connected to optically communicate with said another fiber end, said sensor including a luminescent material having a specific composition

$$Y_3(Ga_{1-x}Cr_x^{+3})_5O_{12},$$

where x lies substantially within a range of 0.032 to 0.078.

5. The assembly according to either of claims 1 or 2 wherein said parameter includes temperature.

6. The assembly according to either of claims 1 or 2 wherein said synchronizing and analyzing means includes means for performing a least squares fit to the digitized amplified photodetector output.

7. The assembly according to either of claims 1 or 2 wherein said synchronizing and analyzing means includes means for taking a logarithm of the digitized amplified photodetector output and then performing a linear least squares fit to said logarithm.

8. The assembly according to either of claims 1 or 2 wherein said synchronizing and analyzing means includes (1) means for measuring an offset level of said digitized amplifier photodetector output in the substantial absence of a parameter related light signal from the sensor, and (2) means utilizing said offset signal for calculating said quantity related to said parameter.

9. An opto-electronic assembly for use with a luminescent sensor of a quantity related to a parameter, comprising the following formed on a single self-supporting substrate in the form of a printed circuit board:
   an optical system attached to said substrate and including:
      a diode having a light radiation output,
      a photodetector, and
      means for providing optical communication between the sensor and each of said diode and photodetector in a manner that said diode radiation output is directed toward said sensor to excite luminescence thereof and said luminescence is directed to said photodetector, a first group of electronic components carried by said substrate in an area adjacent said photodetector and connected to receive and amplify an electrical output from said photodetector,
   a second group of electronic components carried by said substrate in an area adjacent said diode and electrically connected to drive said diode,
   an electronic analog-to-digital signal converter positioned on said substrate adjacent said first group of electronic components and receiving an amplified photodetector output therefrom, thereby to provide a digitized amplified photodetector output,
   means carried by said substrate and electrically connected with at least said second group of electronic components and said signal converter for synchronizing operation of the second group of electronic components and analyzing the digitized amplified photodetector signal in a manner to calculate the quantity related to said parameter, and a connector electrically connected with at least said synchronizing and analyzing means, thereby providing connectability of the assembly within a system wherein the parameter related quantity may be utilized to provide an indication of said parameter.

10. The assembly according to claim 9 wherein said parameter is temperature.

11. The assembly according to claim 9 wherein said optical system communication means is connected to optically communicate with said sensor through a length of optical fiber, and wherein said sensor includes a chromium activated garnet luminescent material.

12. The assembly according to claim 11 wherein said luminescent material consists essentially of a luminescent material having a specific composition $$Y_3(Ga_{1-x}Cr_x^{+3})_5O_{12},$$

where x lies substantially within a range of 0.032 to 0.078.

13. The assembly according to claim 9 wherein said synchronizing and analyzing means includes means for performing a least squares fit to the digitized amplified photodetector output.

14. The assembly according to claim 9 wherein said synchronizing and analyzing means includes means for taking a logarithm of the digitized amplified photodetector output and then performing a linear least squares fit to said logarithm.

15. The assembly according to claim 9 wherein said synchronizing and analyzing means includes (1) means for measuring an offset level of said digitized amplifier photodetector output in the substantial absence of a parameter related light signal from the sensor, and (2) means utilizing said offset signal for calculating said quantity related to said parameter.

16. The assembly according to claim 11 wherein said luminescent material consists essentially of a luminescent material having a specific composition $$Y_3(Al_{1-x}Cr_x^{+3})_5O_{12},$$

where x lies substantially within a range of 0.16 to 0.060.

17. The assembly according to either of claims 1 or 2 which additionally comprises said optical sensor connected to optically communicate with said another fiber end, said sensor including a luminescent material having a specific composition $$Y_3(Al_{1-x}Cr_x^{+3})_5O_{12},$$

where x lies substantially within a range of 0.16 to 0.060.

* * * * *

UNITED STATES PATENT AND TRADEMARK OFFICE
CERTIFICATE OF CORRECTION

PATENT NO. :   5,351,268

DATED      :   September 27, 1994

INVENTOR(S) :  Jensen et al.

Page 1 of 2

It is certified that error appears in the above-identified patent and that said Letters Patent is hereby corrected as shown below:

In Column 19, Line 31 in Claim 1:
  Replace "tional assembly including therein a dichroic beam-" with:

--tical assembly including therein a dichroic beam- --

In Column 19, Line 39 in Claim 1:
  Replace "sembly said and including means connected to" with:

--sembly side and including means connected to--

UNITED STATES PATENT AND TRADEMARK OFFICE
CERTIFICATE OF CORRECTION

PATENT NO. : 5,351,268

DATED : September 27, 1994

INVENTOR(S) : Jensen, et al.

It is certified that error appears in the above-identified patent and that said Letters Patent is hereby corrected as shown below:

In Column 19, Line 44 in Claim 1:
    Replace "cal assembly said and including means electrically" with:

--cal assembly side and including means electrically--

In Column 19, Line 66 in Claim 2:
    Replace "tial solid opaque material in a manner that said commu-" with:

--tially solid opaque material in a manner that said commu---

Signed and Sealed this

Seventh Day of March, 1995

BRUCE LEHMAN

*Attest:*

*Attesting Officer*    *Commissioner of Patents and Trademarks*